Dec. 17, 1940.  M. RESK  2,225,351

PHOTOGRAPHIC CAMERA

Filed March 11, 1939

INVENTOR
*Michel Resk*
BY
*Zoltan F. Holocsy*
ATTORNEY

Patented Dec. 17, 1940

2,225,351

UNITED STATES PATENT OFFICE 2,225,351

PHOTOGRAPHIC CAMERA

Michel Resk, New Rochelle, N. Y.

Application March 11, 1939, Serial No. 261,209

5 Claims. (Cl. 95—42)

This invention relates to new and useful improvements in a photographic camera used by the professional portrait photographer.

The object of this invention is to replace the present Graphlex type camera by eliminating the complicated mechanism used therein, such as the movable mirrors, expensive shutters, winding apparatus, etc., and to provide a simple device with a fixed mirror and inexpensive shutter which will facilitate the work for the operator and allow a better control of the subject image so that the operator may see his subject which is to be photographed, in the upright position for better focusing and composing.

A further object of this invention is to provide a camera in which it is possible to see the image of the subject continuously and permit the operator to operate the shutter without winding or changing the positions of the mirrors, and without going through any mechanical manipulation, thereby ascertaining that the operator's attention is focused only on the image of his subject which is being photographed.

It is still a further object of this invention to produce a very inexpensive camera which will always be operative, will not get out of order, and will require little attention to operate.

More specifically, the invention proposes a camera characterized by a hollow light proof body having a lens mounted through a front wall thereof, and a fixed transparent reflecting mirror mounted across the body diagonally of the lens, and a shutter behind the said mirror to transparently transmit the image when open and to continuously reflect the same, to the ground glass.

Still further it is proposed to form an opening in the side of the hollow light proof body and mount a movable ground glass to this opening for receiving the reflected image from the fixed transparent mirror, for focusing purposes of said camera.

Still further it is proposed to mount an image reversing mirror cover hinged at the bottom edge of said open side obliquely so that the mirror may reverse the image from the upside down position on the ground glass to the upright position on the reversing mirror.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure—

Figure 1:
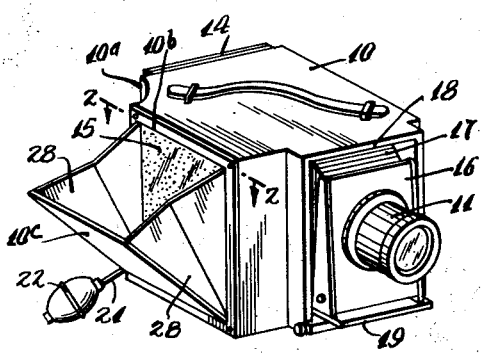
Fig. 1 is a perspective view of a photographic camera constructed according to this invention.
Figure 2:
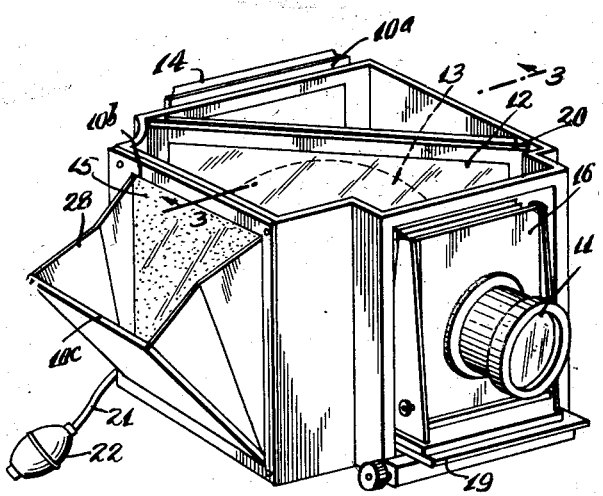
Fig. 2 is a sectional perspective view taken on the line 2—2 of Fig. 1.
Figure 3:
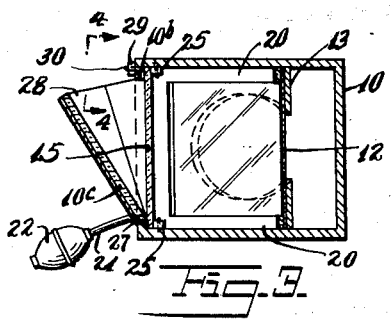
Fig. 3 is a sectional view on the line 3—3 of Fig. 2.
Figure 4:
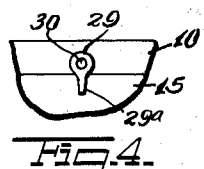
Fig. 4 is a view looking in the direction of the line 4—4 of Fig. 3.

The photographic camera, according to this invention comprises a hollow light-proof body 10 having a lens 11 mounted through the front wall thereof. A fixed transparent reflecting mirror 12 is mounted across the body 10 diagonally of the lens 11. A shutter 13 is mounted behind the mirror 12 to reflect and transparently transmit the image when the shutter is open. Means is provided for holding a film and film holder 14 within the body 10 and behind the shutter 13 and transversely of the lens 11. A ground-glass plate 15 is mounted on the body adjacent an opening in the side wall of the body to the front of the mirror 12 to receive the reflected images from the said mirror.

The lens 11 is fixedly mounted on a plate 16 which is connected to an extension bellows 17 extending through an opening 18 formed in the front wall of the body 10. The plate 16 is mounted on a platform 19 which is adapted to be extended from the bottom of the opening 18 for extending the lens 11 when so desired. Further details of this extendable lens will not be given in connection with this invention since lens of this type are in common use and form no part of this invention.

The rear end of the hollow body 10 is formed with a slot 10ª to permit the film holder 14 to be mounted within the hollow body 10 to the rear of the shutter 13.

The fixed transparent reflecting mirror 12 is constructed from a glass or plastic material known in the trade as "Pelicular" mirror and is attached to one face of a frame 20 which extends diagonally across the box behind the lens.

While a sheet of ordinary clear glass will provide some reflection when disposed at an angle to the light rays transmitted from the lens to the film, it is preferred that the sheet of glass or plastic material be coated on one side with a thin layer of material slightly darker than the glass or plastic material. The coating material, however, is sufficiently thin so that a larger portion of the rays striking the sheet will pass through. An alternative manner of making the mirror is to tint the sheet of glass or plastic material.

The frame 20 is formed of any suitable non-warping material such as glass or other similar material. If this frame were not constructed of non-warp material and it would in some way become warped, it would deform the mirror 12 and distort the image recorded on the film in the film holder 14.

The shutter 13 may be used for time or instantaneous exposures. The shutter is connected by a tube 21 to a conventional operating bulb 22 which controls the opening of the shutter. Further details of this shutter will not be given in connection with this invention since such shutters are known in the trade and forms no part of this invention.

The side wall of the hollow body 10 which is at the front of the mirror 12 is formed with an opening 10b over which the ground glass 15 is mounted. The cover of a reversing mirror 10c is mounted at its bottom edge to the bottom edge of the opening 10b of the ground glass plate 15 by means of a hinge 27. The plate 15 is fixedly attached to the inner wall of the body 10 by means of strip 25, and the upwardly extending sides of the cover of the reversing mirror 10c and the opening 10b are connected together by accordion members 28 which limit the pivoting of the reversing mirror cover to an oblique position in which it extends from the said side wall.

When this cover of the reversing mirror 10c is in the open position the image passing through the lens 11 will be reflected from the mirror 12 to the ground glass plate 15 and therefrom to the reversing mirror 10c where it may be viewed at the bottom, horizontally in an upright position, by the operator of the camera for composing and focusing the same.

When the camera is not being used the cover of the reversing mirror 10c may be moved to its closed position and a lock element 29 is pivotally supported upon a pin 30 extending from the side wall of the hollow body 10 at the top of the opening and is formed with an extension 29ª which is adapted to engage over the top edge of the cover of the reversing mirror 10c for holding this cover in its closed position. While the cover of the reversing mirror 10c is open and the camera properly focused the shutter 13 is momentarily opened and the image from the lens 11 will pass through the mirror 12 and contact the film 14 to record the image of the object in front of the lens 11.

It is to be understood that the reflecting mirror may be set at any diagonal position in the camera, then the corresponding ground glass and reversing mirror will also be transferred to a corresponding position.

It is also to be understood that the plate glass mirror reflector and the plastic transparent reflecting mirror may be coated with suitable transparent reflectory substances such as silver, aluminum, etc., to increase the reflecting power on the focusing ground glass.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A photographic camera, comprising a hollow light-proof body, a lens mounted through a front wall of said body, a fixed transparent reflecting mirror mounted across said body diagonally of said lens, means for holding a film within said body behind said mirror transversely of said lens, a ground glass or the like plate mounted on said body across an opening in the side wall thereof in the path of the light reflected by said mirror, a shutter mounted diagonally across said body parallel to said mirror and behind said mirror forming a light-proof compartment for said film, a portion of the light passing through said lens being reflected to said ground glass by said mirror, and means for momentarily opening said shutter so that light may pass through said mirror to said film when said shutter is opened.

2. A photographic camera, comprising a hollow, light-proof body, a lens mounted in a front wall of said body, a fixed transparent reflecting mirror mounted across said body diagonally of said lens, a shutter behind said mirror forming a light-proof compartment, means for holding a film within said light-proof compartment behind said shutter and transversely of said lens, a ground glass or the like plate mounted on said body across an opening in the side wall of the body in the path of the light reflected by said mirror, said transparent reflecting mirror being constructed of plastic membrane and having its edges attached to the walls of a frame, said frame being supported in said body so that the said plastic membrane shall always reflect the image to the ground glass and transmit a non-distorted image to the film, said ground glass plate being attached to the inner face of said side wall adjacent said opening, a member mounted on the side wall of said hollow body forming a cover for said opening, said member being pivoted to said side wall so as to be swingable to an angular position with relation to said side wall, pliable side elements attached to said side wall and said member and extending between the side edges of said opening and the side edges of said member, and a common exterior reversing mirror mounted on the inner side of said member to reverse the image on the ground glass to upright position.

3. A photographic camera, comprising a hollow, light-proof body, a lens mounted through a front wall of said body, a transparent reflecting mirror affixed across said body diagonally of said lens, means for holding a film within said body behind said mirror transversely of said lens, a ground glass or the like plate mounted on said body across an opening in the side wall thereof in the path of the light reflected by said transparent mirror, a shutter mounted across said body behind said mirror forming a light-proof compartment for said film, a portion of the light passing through said lens being reflected to said ground glass by said mirror, and means for momentarily opening said shutter so that light may pass through said mirror to said film when said shutter is opened.

4. In a camera comprising a hollow, light-proof body having a lens mounted in the front wall thereof and means for holding a photosensitive film within said body at the rear thereof; a vertically disposed, transparent mirror affixed within said body between said lens and said means, said mirror extending diagonally across the body, shutter means between said transparent mirror and said means for holding the film, a ground glass plate mounted in the side of said casing for receiving the image reflected by said mirror, and an inclined mirror mounted on the outside of said body facing said plate, the lower edge of said inclined mirror being nearest the plate whereby said inclined mirror reflects the image on the plate upwardly.

5. In a camera comprising a hollow, light-proof body having a lens mounted in the front end thereof and film-holding means at the back end; a transparent mirror fixed between said lens and said means, shutter means between said mirror and said means, a translucent window in one of the side walls of said body, and a mirror pivotally attached to said body adjacent the lower edge thereof outside said window, the plane of the transparent mirror being inclined with respect to the plane of said translucent window and said film-holding means, said second-mentioned mirror being inclined to both said reflecting mirror and said translucent window to reflect the image in said window in a generally upwardly direction.

MICHEL RESK.